_United States Patent Office_

2,900,275
Patented Aug. 18, 1959

2,900,275

DYE COMPOSITION AND METHOD OF DYEING TIGHTLY WOUND GLASS FIBERS SIZED WITH A WATER SWELLABLE MATERIAL

Ralph N. Kingsbury, Stratford, Conn., and Remus F. Caroselli, Manville, R.I., assignors to Owens-Corning Fiberglas Corporation, Toledo, Ohio, a corporation of Delaware No Drawing. Application January 21, 1955
Serial No. 483,427

12 Claims. (Cl. 117—63)

This invention is a continuation-in-part of our co-pending application Serial No. 303,614, filed August 9, 1952, now abandoned, and entitled Dye Composition for Fibrous Glass.

This invention relates to a new and improved dye composition for coloring glass fibers and more particularly to a dye system which permits the use of a more economical and expedient process for securing the desired depth of color and shading substantially uniformly over the surfaces of glass fibers, especially when arranged in a compact package.

This invention has particular application in the coloring of glass fibers adapted for use in the manufacture of textile fabrics and in the manufacture of electrical insulations wherein the yarns and fibers are woven or braided into insulations subsequently to be exposed to atmospheric conditions and to enamels and lacquers in the manufacture of electrical products. Such fibers and yarns may also be used as tracer fibers in combination with other fibers in the manufacture of electrical insulations and the like.

To the present, glass fibers intended for such applications are treated in forming with a size having a gelatin or a starch base which, as compared to other fiber size compositions, have been found to provide suitable protection for the glass fiber surfaces and to provide a more receptive and permanent bae for the dye color. Under conditions of use, the gelatin or starch base remains strongly anchored to the glass fiber surfaces even under such high humidity conditions as would ordinarily have permitted a water film to intervene between the glass fiber surfaces and other coating or size composition and which is capable of receieving and permanently anchoring a dye color to form a substantially permanently colored fibrous product.

When such fibers are to be colored, it has been customary to color the fibers subsequent to their formation into twisted strands packaged on a twister tube. It would be most desirable to be able to dye the package of fibers while on the twister tube, but it has been found that with dye systems heretofore employed, penetration of the dye composition uniformly to cover the glass fiber surfaces has been difficult to achieve. It is believed that the difficulties arise from the fact that the aqueous medium usually employed for dye coloring causes the size containing gelatin, starch or other water swellable hydrophilic colloid present as a coating on the glass fiber surfaces to swell sufficiently to block penetration of the dye composition into the interior of the package.

As a result, it has been necessary to rewind the package of twisted strands of glass fibers from the twister tube onto a special perforated dye shell and also to limit the thickness of the fiber layer on the shell to enable the penetration of the dye composition to take place from outside the package as well as through the foraminous tube either by normal slow seepage or more rapidly by the use of pressure and vacuum or both in alaternating cycles. After drying the dyed strands are rewound from the dye shell onto another tube for subsequent shipment as a package to stations of use in forming braided or woven structures. It will be apparent from this discussion of the prior processes that a number of extra winding operations are involved with limitations as to the thickness of the package of fibers to insure satisfactory penetration and uniform coloring of the glass fiber surfaces. It will be apparent that any process or composition capable of use to achieve dyeing of the glass fibers on the twister tube will provide considerable savings in time, labor and materials and will markedly lower the cost of the colored glass fibers. It is an object of this invention to accomplish this result by the use of a new and improved dye system.

Another object is to produce a dye composition which permits glass fibers having a gelatin size to be colored in a more efficient and economical manner and it is a related object to produce a dye composition of the type described characterized by its ability uniformly and rapidly to penetrate into the package of fibers to enable coloring without rewinding from the twister tube and which is not so limited as to the thickness of the layer of fibers in the package thereby to enable more fiber to be colored in a single operation.

A further object is to produce a stable dye composition which becomes substantially completely insolubilized or resistant to water on the glass fiber surfaces upon drying, which resists bleeding in lacquer or varnish, which improves the physical characteristics of the glass fibers in such properties as strengths and appearance and which enhances the mechanical characteristics of the glass fibers to introduce braiding qualities comparable to that of cotton yarn, which characteristics have not been available in glass fibers dye colored by processes which have heretofore been employed.

Successful practice of this invention has been found to reside in a particular combination of materials which give the desired depth of color and shading coupled with complete penetration into the package of fibers in a sufficiently rapid and efficient manner to permit uniform coloring without rewinding the twisted strands from a twister tube onto a special dye shell and which, upon drying, renders the coloring agent substantially resistant to acqueous medium and resistant to crocking or bleeding into other materials which might be associated therewith.

In accordance with the practice of this invention, these new and novel characteristics have been made available by the formulation of a size composition that makes use of a dye system that is incapable of causing swelling of the forming size, which embodies sufficiently low surface and interfacial tension to both penetrate the interstices and wet the surface of the fibers in the package and in which the dyestuff is sufficiently soluble to enable the development of the desired intensity and depth of color with bleeding as an incidence to normal use of the dyed fiber.

Dyestuffs which have heretofore been employed for coloring glass fibers, in fact, the great majority of dyestuffs available for use, are incapable of being employed in the practice of this invention for coloring glass fibers. It has been found that the new and novel concepts described can be secured by the use of an acid dyestuff which may be defined broadly as a spirit soluble metalliferous substituted guanidine salt of an azo dyestuff and more particularly as a di-substituted guanidine salt of a metalliferous azo dye. These comprise a guanidine substituted from the class of radicals consisting of alkyl, aralkyl, aryl and cyclohexyl, such as di(ortho-tolyl) guanidine, di(para-phenetyl) guanidine, di(ortho-anisyl) guanidine, and di-xylyl guanidine reacted in a neutral solvent with an azo dye having a sulfonic or carboxylic acid constituent and metallized preferably with copper or chromium or with another metal from the group having an atomic weight within the range of 51.9 to 64, or with an alkali metal for greater water compatibility. It is preferred to make use of an azo dye having a hydroxy group ortho to azo and which may have a hydroxy group ortho to a carboxy group. For a fuller description of dyestuffs of the type described, reference may be had to the U.S. Patent No. 2,165,034, issued on July 4, 1939.

Representative of the dyestuffs which may be used in the practice of this invention are the class of "Luxol" dyes marketed by E. I. du Pont de Nemours & Company, or the "Calcofast" dyes of the Calco Chemical Company, or the "Azosol" or "Palatine" dyes of the General Dyestuffs Corporation, listed as follows:

>    Luxol Fast Yellow T
>    Luxol Fast Yellow G
>    Luxol Fast Orange GS
>    Luxol Fast Orange R
>    Luxol Fast Brown K
>    Luxol Fast Brown R
>    Luxol Fast Scarlet C
>    Luxol Fast Red B
>    Luxol Fast Red BB
>    Luxol Fast Blue AR
>    Luxol Brilliant Green GL
>    Luxol Fast Green B
>    Calcofast Yellow 2R
>    Calcofast Orange R
>    Azosol Fast Black MA
>    Palatine Yellow The Calcofast Yellow 2R concentrate may be identified as the di(ortho-tolyl) guanidine salt of the azo combination 2 amino-5-sulfo-benzoic acid→1-(sulfo-phenyl)-3-methyl pyrazolone metallized with chromium. The Azosol Fast Black MA may be further identified as essentially a sodium salt of p-nitrobenzene azo-3,6-disulfo-1-amino-8 naphthol azo benzene.

Important also in the dye system embodying features of this invention is the use of a diluent composed chiefly of spirit solvents whereby swelling effects on the size coating on the glass fiber surfaces are substantially avoided and wetting out is achieved upon contact with the glass fiber surfaces in a manner sufficient to permit rapid and complete penetration of the package of fibers from one or from both directions thereby to achieve the desired coloring effect without the necessity of rewinding from the twister tube onto a special dye shell and without limitation as to the thickness of the layer of twisted strands applied onto the twister tube. While ethanol, isopropanol and the like may be used as the spirit solvent, it is preferred to make use of methanol, especially when a Werner complex compound is present for purposes which will hereinafter be described. The amount of dye embodied in the diluent is unimportant so long as the concentration thereof is sufficient to impart the desired depth of color and shade to the glass fiber surfaces.

A further important concept of this invention resides in the formulation of the dyestuff into a composition which not only provides for more rapid and complete penetration of the coloring matter into the package of fibers but which functions, in addition, to anchor the dyestuff to the glass fiber surfaces and particularly into the size existing as a coating on the glass fibers to increase the permanence of the color and the range and intensity of the colors capable of being applied to the glass fibers.

These characteristics in a dye composition are best developed by the use of a solvent system in which a small amount of water is present sufficient to enhance the anchorage of the dyestuff with the size coating of the glass fiber surfaces but insufficient to cause swelling of the size so as to interfere with the complete and rapid penetration of the dye composition into the package. The amount of water which may be formulated into the dye composition is less than 10 percent by weight of the composition and, when present, it is preferably maintained within the range of about 1–3 percent by weight. In addition to water, the solvent system for the size composition may be modified advantageously by the addition of alcohol ether solvents such as methyl Cellosolve, ethyl Cellosolve and the like in amounts up to about 5 percent by weight of the size composition.

It has been found that the group of dyes of the type described may be insolubilized or made resistant to aqueous medium by setting in combination with a Werner complex compound preferably having a fatty acid group comprising the acido group coordinated with the trivalent nuclear chromium atom. The Werner complex compound is incapable of disturbing the stability of the dye composition or insolubilizing the dye while in solvent solution but it apparently becomes operative upon drying to fix the dye on the glass fiber surfaces and render the dyed fibers more insoluble to alcohol and minimize bleeding in lacquers or varnishes. Representative of the complex compounds which may be used are stearato chromic chloride and other Werner complex compounds of the type described in the Iler Patent No. 2,273,040 or the Steinman Patent No. 2,552,910 wherein an acido group having a carbon length greater than 10 in Iler for lubricity and between 2 and 7 in Steinman to improve a resinous adhesion and bonding is coordinated with a trivalent nuclear chromium atom. The latter complex compounds function in addition to render the dye composition more strongly bonded to the glass fiber surfaces and more receptive to resins or other materials of similar nature which might be associated with the colored glass fibers. The amount of Werner complex compound in the dye system depends upon the concentration of the dye. In general, the Werner complex compound should be present preferably in amounts ranging from 1 part by weight dye to ½–4 parts by weight of the complex compound but variation up to 50 percent in either direction has been found to be suitable.

The following compositions, given by way of illustration and not by way of limitation, are representative of dye systems which may be used in the practice of this invention:

*Example 1*

Dye composition:

| | |
|---|---:|
| Di-ortho-tolyl guanidine salt of the azo combination 1 amino-2-naphthol 4 sulfonic acid→1 naphthol 8 sulfonic acid in which chromium is the metallic component of the metalliferous azo dye _____ pounds__ | 1.6 |
| Water _____gallons__ | 1.0 |
| Methanol _____do____ | 20.0 |
| Methyl ricinoleate _____do____ | 2.5 |
| Stearato chromic chloride, 30 percent in isopropanol _____gallons__ | 1.5 |
| Salicylanilide (fungicide) _____grams__ | 25 |

In compounding the dye composition, the stearato chromic chloride solution is added to the ricinoleate, heated to about 225° F. and then the mixture is allowed to cool to room temperature. The dye is dissolved in 15 gallons of the methanol and water and the stearato chromic chloride-ricinoleate mixture is added thereto. The additional alcohol is used to rinse the containers of the ricinoleate and stearato chromic chloride to recover any amounts which might remain in the mixing pan and then added to the composition. The salicylanilide can be added to the final mixture.

In operation, the twister tubes, with perforations through the tube walls, may be mounted on suitable spindles within a closed container and the dye composition admitted to the container from one direction for flow through the thickness of fibers wound upon the tube to the spindle where the dye composition drains into a reservoir. This unidirectional flow may be continued for one to two minutes and then the flow reversed from the reservoir through the inside of the tube to the outside of the package back to the original source. In all, treatment to secure the desired depth of color and shading may be secured by exposure of the fibers to the dye composition for a period of five minutes or less. While air drying is sufficient to secure elimination of the solvent and proper setting of the dye on the glass fiber surfaces, it is preferred to set the dye and to hasten the elimination of solvent by exposure to threshold temperatures up to about 225° F. for a short time.

It is found that upon drying, the dye has become fixed on the glass fiber surfaces in a manner to resist solution or deterioration in subsequent use and to minimize crocking or the possibility of bleeding into materials which might be associated therewith in subsequent applications. It is believed that the combination of the Werner complex compound with the particular dye functions in a new and novel manner to fix the dye on the glass fiber surfaces upon drying and further in combination with the ricinoleate functions as a flexibilizer and water repellant to improve the physical characteristics of the glass fibers with respect to its resistance to attack by aqueous medium and other substances with which the fibers might come in contact and to improve the braiding qualities thereof to the point where the fibers become comparable to that of cotton yarn or the like.

The methyl ricinoleate embodied in the dye composition provides what appears to be a novel combination of functions, namely, as a lubricant and which improves the processing and performance characteristics of the dyed glass fibers when used in combination with the Werner complex compound. When present, the methyl ricinoleate improves the braiding characteristics of the yarn. The methyl ricinoleate may be incorporated in amounts up to 15 percent by weight of the dye composition. Where chalking is of lesser importance, the amount of ricinoleate may be reduced to a minimum or substantially completely eliminated. Though not equivalent, the methyl ricinoleate may be displaced by castor oil and other stable oils and derivatives thereof. Other suitable fungicides can be used in the treating composition in comparable amounts.

*Example 2*

Composition for coloring the fibers violet:

| | |
|---|---|
| Reaction product of the copper complex of the azo combination prepared from 2 moles of diazotized anthranilic acid and 1 mole of rhoduline acid treated with 10 parts of a solution of 11% di-ortho-tolyl guanidine hydrochloride ___pounds__ | 2.0 |
| Methanol _____gallons__ | 15.0 |
| Ethanol _____do____ | 5.0 |
| Castor oil _____do____ | 2.5 |
| Octadecyl chromic chloride, 30% in ethanol gallons__ | 1.5 |

*Example 3*

Composition for coloring the fibers red:

| | |
|---|---|
| The azo combination prepared by diazotization of 4-chloro-2-amino phenol 6 sulfonic acid coupled with 1-(4'-sulfo-phenol)-3-methyl-5-pyrazolone converted to a chromium complex and reacted with di-ortho-tolyl guanidine hydrochloride pounds__ | 1.75 |
| Methanol _____gallons__ | 22.0 |
| Dodecyl chromic chloride, 30% in methanol gallons__ | 1.5 |
| Methyl ricinoleate _____do____ | 1.0 |
| Fungicide _____grams__ | 20 |
| Water _____gallons__ | 0.3 |

*Example 4*

Composition for coloring the fibers yellows:

| | |
|---|---|
| A dyestuff (di-ortho-tolyl-guanidine salt of the azo combination coupler 2 amino-5-sulpho-benzoic acid ⟶ 1-(sulpho-phenyl)-3-methyl-5 pyrazolone metallized with chromium)_____pounds__ | 2.0 |
| Methanol _____gallons__ | 24.0 |
| Werner complex compound, 30% in alcohol_____do____ | 2.5 |
| Fungicide _____grams__ | 25 |

*Example 5*

Composition for coloring the fibers yellow:

| | |
|---|---|
| Palatine Yellow _____grams__ | 3700 |
| Methyl Cellosolve _____pounds__ | 40.0 |
| Water _____do____ | 16.0 |
| Methyl alcohol _____do____ | 600 |

*Example 6*

Composition for coloring the fibers black:

| | |
|---|---|
| Sodium salt of p-nitrobenzene azo-3,6-disulfo-1, amino-8 naphthol azo benzene _____grams__ | 400 |
| Methyl Cellosolve _____pounds__ | 40 |
| Water _____do____ | 20 |
| Methyl alcohol _____do____ | 500 |

While the dye system described and claimed herein finds particular use in the coloring of glass fibers previously sized with a gelatin or other water swellable size composition and packaged in a compact bundle, it is possible to produce new and improved colored glass fibers by the use of compositions of the type described for the treatment of glass fibers embodying other size systems and when arranged in forms other than in a compact package.

It has been found that the combination of the described spirit soluble acid dyes, Werner complex compound and alcohol solvent, with or without the addition of limited amounts of water, provides the characteristics which permit rapid and uniform penetration of the dye composition into a compact package of gelatin sized glass fibers, with sufficient solubility to permit repeated use of the dye composition in the dye coloring of successive batches of glass fibers and yet fixes the dye on the glass fiber surfaces upon drying substantially to eliminate crocking, chalking or bleeding of the treated fibers in position of use and where used in combination also with oily constituents provides braiding qualities heretofore available only with cotton yarns.

While the claims herein cover the new and novel system with glass fibers, the concepts described herein for the coloring of glass fibers are applicable to the dyeing of cotton, and cellulosic and synthetic fibers of the type Dynel, Dacron, Orlon, Saran and the like.

It will be understood that changes may be made with respect to the various ingredients and their concentrations in the dye composition and in the application of the dye compositions in the treatment of glass fibers without departing from the spirit of the invention, especially as defined in the following claims.

We claim:

1. A composition for coloring glass fibers having a size on the surfaces thereof formed with a water swellable, hydrophilic colloid comprising in combination a spirit soluble dye consisting of a guanidine substituted with a radical selected from the group consisting of alkyl, aralkyl, aryl and cyclohexyl salt of a metallized azo dye having at least one acid group selected from the group consisting of sulfonic and carboxy and present in amounts sufficient to impart the desired depth of color, alcohol and water as the solvent media in which the water is present in amounts up to 10 percent by weight, and a Werner complex compound in which an organic acido group is coordinated with a trivalent nuclear chromium atom and is present in amounts ranging from 1 part by weight dye to ¼–8 parts by weight of the Werner complex compound.

2. A composition for dye coloring glass fibers comprising the combination of a spirit soluble dye consisting of a guanidine di-substituted with a radical selected from the group consisting of alkyl, aralkyl, aryl and cyclohexyl salt of a metallized azo dye having at least one acid group selected from the group consisting of sulfonic and carboxy and in which the metallizing group is a metal within the atomic weight range of 51.9 to 64.0, and alcohol and water as the solvent media in which the water is present in amounts up to 10 percent by weight, and a Werner complex compound in which an acido group is coordinated with a trivalent nuclear chromium atom and is present in amounts ranging from ½–4 parts by weight per 1 part by weight of the dyestuff.

3. A composition as claimed in claim 2 in which the Werner complex compound comprises stearato chromic chloride.

4. A composition for dye coloring glass fibers having a size on the surfaces thereof containing a hydrophilic, water swellable colloid comprising a spirit soluble dye consisting of a guanidine substituted with a radical selected from the group consisting of alkyl, aralkyl, aryl and cyclohexyl salt of a metallized azo dye having at least one acid group selected from the group consisting of sulfonic and carboxy and present in amounts sufficient to impart the desired depth of color, alcohol and water as the solvent media in which the water is present in amounts less than 10 percent by weight, a Werner complex compound having an organic acido group coordinated with a trivalent nuclear chromium atom and which functions upon drying to fix the dye on the glass fiber surfaces, and a lubricant selected from the group consisting of methyl ricinoleate and castor oil.

5. A composition for dye coloring glass fibers sized with a material containing a water swellable, hydrophilic colloid comprising a spirit soluble dye consisting of a guanidine substituted with a radical selected from the group consisting of alkyl, aralkyl, aryl and cyclohexyl salt of a metallized azo dye having at least one acid group selected from the group consisting of sulfonic and carboxy and present in amounts to impart the desired color to the glass fibers, alcohol as the solvent medium, a Werner complex compound in which the organic acido group is coordinated with a trivalent nuclear chromium atom and is present in amounts ranging from ½–4 parts by weight thereof to 1 part by weight of the dye, and up to 15 percent by weight of a lubricant selected from the group consisting of methyl ricinoleate and castor oil.

6. A composition as claimed in claim 5 which includes a small amount of a fungicide.

7. A composition for coloring glass fibers sized with a composition containing a water swellable, hydrophilic colloid comprising the combination of a spirit soluble dye consisting of a guanidine di-substituted with a radical selected from the group consisting of alkyl, aralkyl, aryl and cyclohexyl salt of a metallized azo dye having at least one acid group selected from the group consisting of sulfonic and carboxy and present in amounts to impart the desired depth of color, alcohol as the solvent medium, and a Werner complex compound in which an organic acido group is coordinated with a trivalent nuclear chromium atom and is present in amounts ranging from ½–4 parts by weight thereof to 1 part by weight of the dye.

8. The method of coloring glass fibers while tightly wound in a package and in which the glass fibers are sized with a composition containing a water swellable, hydrophilic colloid, comprising the step of impregnating the package with a dye composition comprising in combination a spirit soluble dye consisting of a guanidine salt of a metallized azo dye having at least one acid group selected from the group consisting of sulfonic and carboxy and present in amounts sufficient to impart the desired depth of color and in which the guanidine is di-substituted with a radical selected from the group consisting of alkyl, aralkyl, aryl and cyclohexyl, alcohol and water as the solvent media in which the water is present in amounts up to 10 percent by weight, and a Werner complex compound in which an organic acido group is coordinated with a trivalent nuclear chromium atom and is present in amounts ranging from 1 part by weight dye to ¼–8 parts by weight of the Werner complex compound.

9. The method of coloring glass fibers while tightly wound in a package and in which the glass fibers are sized with a composition containing a water swellable, hydrophilic colloid, comprising the step of impregnating the package with a dye composition comprising a spirit soluble dye consisting of a guanidine salt of a metallized azo dye having at least one acid group selected from the group consisting of sulfonic and carboxy and present in amounts sufficient to impart the desired depth of color and in which the guanidine is di-substituted with a radical selected from the group consisting of alkyl, aralkyl, aryl and cyclohexyl, alcohol and water as the solvent media in which the water is present in amounts less than 10 percent by weight, a Werner complex compound having an organic acido group coordinated with a trivalent nuclear chromium atom and which functions upon drying to fix the dye on the glass fiber surfaces, and a clear, glass fiber lubricant.

10. The method of coloring glass fibers while tightly wound in a package and in which the glass fibers are sized with a composition containing a water swellable, hydrophilic colloid, comprising the step of impregnating the package with a dye composition comprising a spirit soluble dye consisting of a guanidine salt of a metallized azo dye having at least one acid group selected from the group consisting of sulfonic and carboxy and present in amounts to impart the desired color to the glass fibers and in which the guanidine is di-substituted with a radical selected from the group consisting of alkyl, aralkyl, aryl and cyclohexyl, alcohol as the solvent medium, a Werner complex compound in which the organic acido group is coordinated with a trivalent nuclear chromium atom and is present in amounts ranging from ½–4 parts by weight thereof to 1 part by weight of the dye, and up to 15 percent by weight of a clear, glass fiber lubricant.

11. The method of coloring glass fibers while tightly wound in a package and in which the glass fibers are sized with a composition containing a water swellable, hydrophilic colloid, comprising the step of impregnating the package with a dye composition comprising a spirit soluble dye consisting of a guanidine salt of a metallized azo dye having at least one acid group selected from the group consisting of sulfonic and carboxy and present in amounts to impart the desired color to the glass fibers and in which the guanidine is di-substituted with a radical selected from the group consisting of alkyl, aralkyl, aryl and cyclohexyl, alcohol as the solvent medium, a Werner complex compound in which the organic acido group is coordinated with a trivalent nuclear chromium atom and is present in amounts ranging from ½–4 parts by weight thereof to 1 part by weight of the dye, and up to 15 percent by weight of a lubricant and in which the lubricant comprises methyl ricinoleate.

12. The method of coloring glass fibers while tightly wound in a package and in which the glass fibers are sized with a composition containing a water swellable, hydrophilic colloid, comprising the step of impregnating the package with a dye composition comprising the combination of a spirit soluble dye consisting of a guanidine salt of a metallized azo dye having at least one acid group selected from the group consisting of sulfonic and carboxy and present in amounts to impart the desired depth of color and in which the guanidine is di-substituted with a radical selected from the group consisting of alkyl, aralkyl, aryl and cyclohexyl, alcohol as the solvent medium, and a Werner complex compound in which an organic acido group is coordinated with a trivalent nuclear chromium atom and is present in amounts ranging from ½–4 parts by weight thereof to 1 part by weight of the dye.

References Cited in the file of this patent

UNITED STATES PATENTS

| | | |
|---|---|---|
| 2,165,034 | Daubt et al. | July 4, 1939 |
| 2,176,403 | Koch | Oct. 17, 1939 |
| 2,428,302 | Trowbridge | Sept. 20, 1947 |
| 2,434,173 | Mackenzie et al. | Jan. 6, 1948 |
| 2,552,910 | Steinman | May 15, 1951 |
| 2,623,834 | Armitage | Dec. 30, 1952 |